United States Patent [19]

Wrey et al.

[11] Patent Number: 5,986,665
[45] Date of Patent: Nov. 16, 1999

[54] ELECTRONIC GRAPHIC SYSTEM

[75] Inventors: Colin John Wrey, Newbury; Matthew Sumner, Marlborough, both of United Kingdom

[73] Assignee: Quantel Limited, Newbury, United Kingdom

[21] Appl. No.: 08/922,906

[22] Filed: Sep. 3, 1997

[51] Int. Cl.⁶ ................................................. G06F 15/00
[52] U.S. Cl. ........................................................ 345/429
[58] Field of Search ................................... 345/429, 430, 345/431, 432, 425, 428

[56] References Cited

U.S. PATENT DOCUMENTS

| | | | |
|---|---|---|---|
| 4,514,818 | 4/1985 | Walker | 364/521 |
| 4,602,286 | 7/1986 | Kellar et al. | 358/183 |
| 5,675,720 | 10/1997 | Sato et al. | 395/119 |
| 5,831,604 | 11/1998 | Gerber | 345/199 |

FOREIGN PATENT DOCUMENTS

| | | |
|---|---|---|
| 2089625 | 6/1982 | United Kingdom . |
| 2113950 | 8/1983 | United Kingdom . |

*Primary Examiner*—Phu K. Nguyen
*Attorney, Agent, or Firm*—Cooper & Dunham LLP

[57] ABSTRACT

An electronic graphic system comprises an image store for storing data defining an initial image, an address generator for generating address data identifying multiple dot areas in the store, and a processor for processing the data in each dot area so that picture elements in the dot area are defined by data of a substantially uniform value. The processed data thus defines a multiplicity of picture elements that together form an image of multiple dot areas derived from the initial image data. The system can be applied to data defining a still image and to video data defining a moving image. When applied to video data the dot areas can be varied on a time basis.

57 Claims, 6 Drawing Sheets

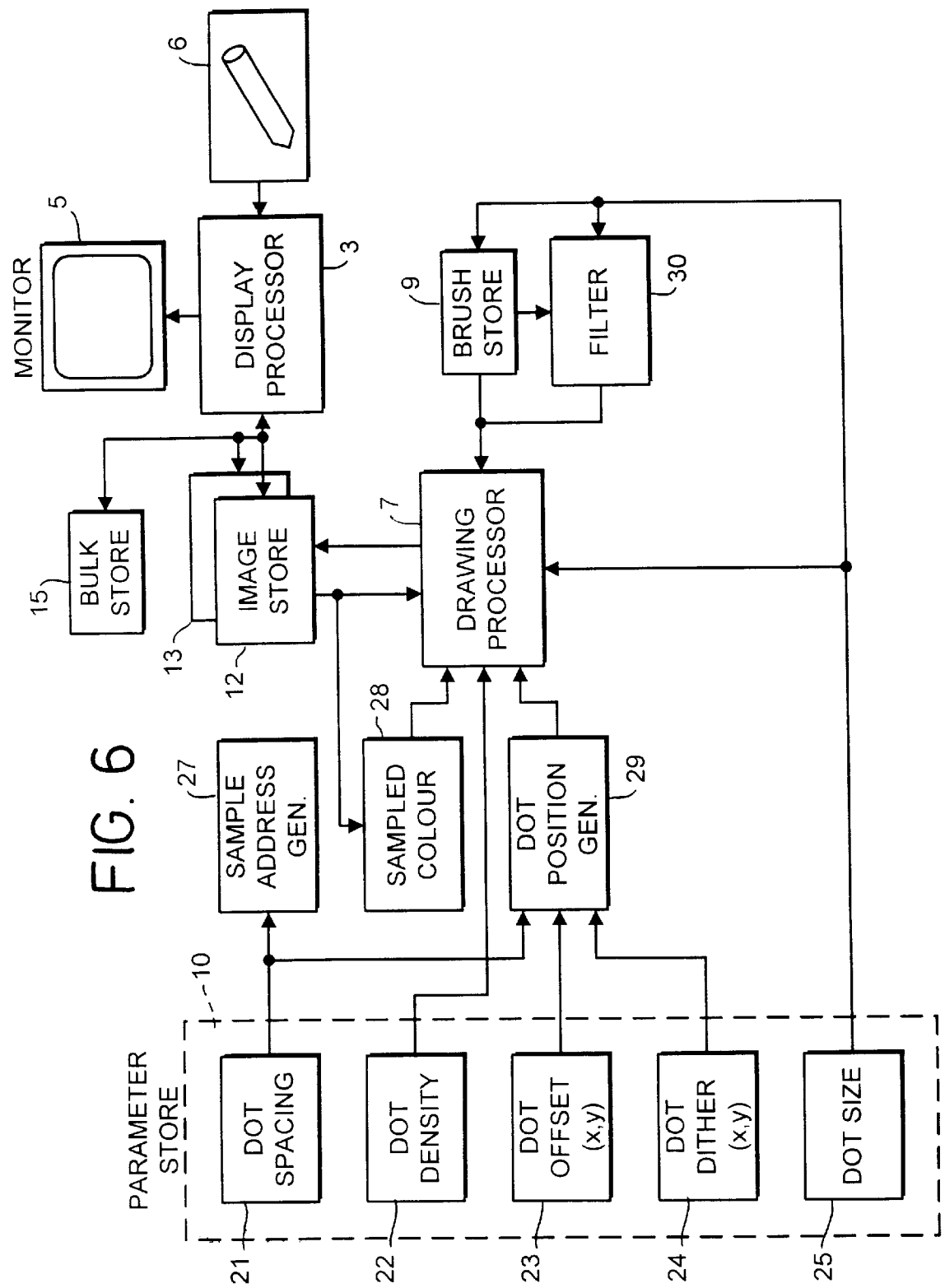

ELECTRONIC GRAPHIC SYSTEM

The invention relates to an electronic graphic system.

Electronic graphic or image systems in which the painting or drawing of a colour image can be simulated, or a portion of one image can be merged into another by electronic means are well known. One such graphic system is described in our British patent number 2,089,625 and corresponding U.S. Pat. No. 4,514,818, the teachings of which are incorporated herein by reference. This system includes a user operable input device which may be used by the user to select from a range of colours and a range of intensities and to choose from a set of notional drawing implements for use in the painting or drawing.

When a colour is chosen by the user, values representing the components of the selected colour are stored in a colour register. An implement is chosen by selecting from among different implement representations displayed on a display screen and the selected implement is defined by parameters conforming to a 3-dimensional surface representing the profile of the implement. Generally speaking the implement profile will have a high centre falling away to a lower value toward the periphery of the profile although other profiles may, of course, be defined. The implement profile represents the notional distribution of colour which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. Position signals are output at regular intervals from the stylus/touch tablet device. For some implements, representing say paint brushes, implement data is generated for each movement of the stylus by the distance between picture points or similar distance, whilst for other implements, say air brushes, implement data is generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected colour data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desire colour and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen colour in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the user to observe his creation, the stored picture is read repeatedly and the pixels are applied to a TV-type colour monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

Another system which enables a user to perform picture composition in addition to painting is described in our British Patent No. 2113950 and corresponding U.S. Pat. No. 4,602,286, the teachings of which are also incorporated herein. In this system stores are provided for storing data representing two independent pictures and a control image or stencil. A stencil is produced for example by "drawing" data into the control image store. The stencil data is used to control the combining of the data representing the two independent pictures to produce data representing a composite picture. The data representing the composite picture is output continuously for display of the picture on a monitor. Once the user is satisfied with the displayed composite picture the composite data is stored permanently for subsequent processing or printing for example.

According to one aspect of the invention there is provided an electronic graphic system comprising: an image store for storing data defining a multiplicity of picture elements that together form an initial image; an address generator for generating address data identifying multiple dot areas in the store, each area containing data defining a plurality of picture elements of the initial image; and a drawing processor for processing the data in each dot area so that picture elements in the dot area are defined by data of a substantially uniform value, the processed data thus defining a multiplicity of picture elements that together form a processed image of multiple dot areas derived from the initial image data.

According to another aspect of the invention there is provided a method processing image data the method comprising: storing in a store data defining a multiplicity of picture elements that together form an initial image; generating address data identifying multiple dot areas in the store, each area containing data defining a plurality of picture elements of the initial image; and processing the data in each dot area so that picture elements in the dot area are defined by data of a substantially uniform value, the processed data thus defining a multiplicity of picture elements that together form a processed image of multiple dot areas derived from the initial image data.

The above and further features of the invention are set forth with particularity in the appended claims and together with advantages thereof will become clearer from consideration of the following detailed description of an exemplary embodiment of the invention given with reference to the accompanying drawings.

In the drawings:

FIG. 6 shows the system reconfigured to produce a dots effect;

Figure 1:
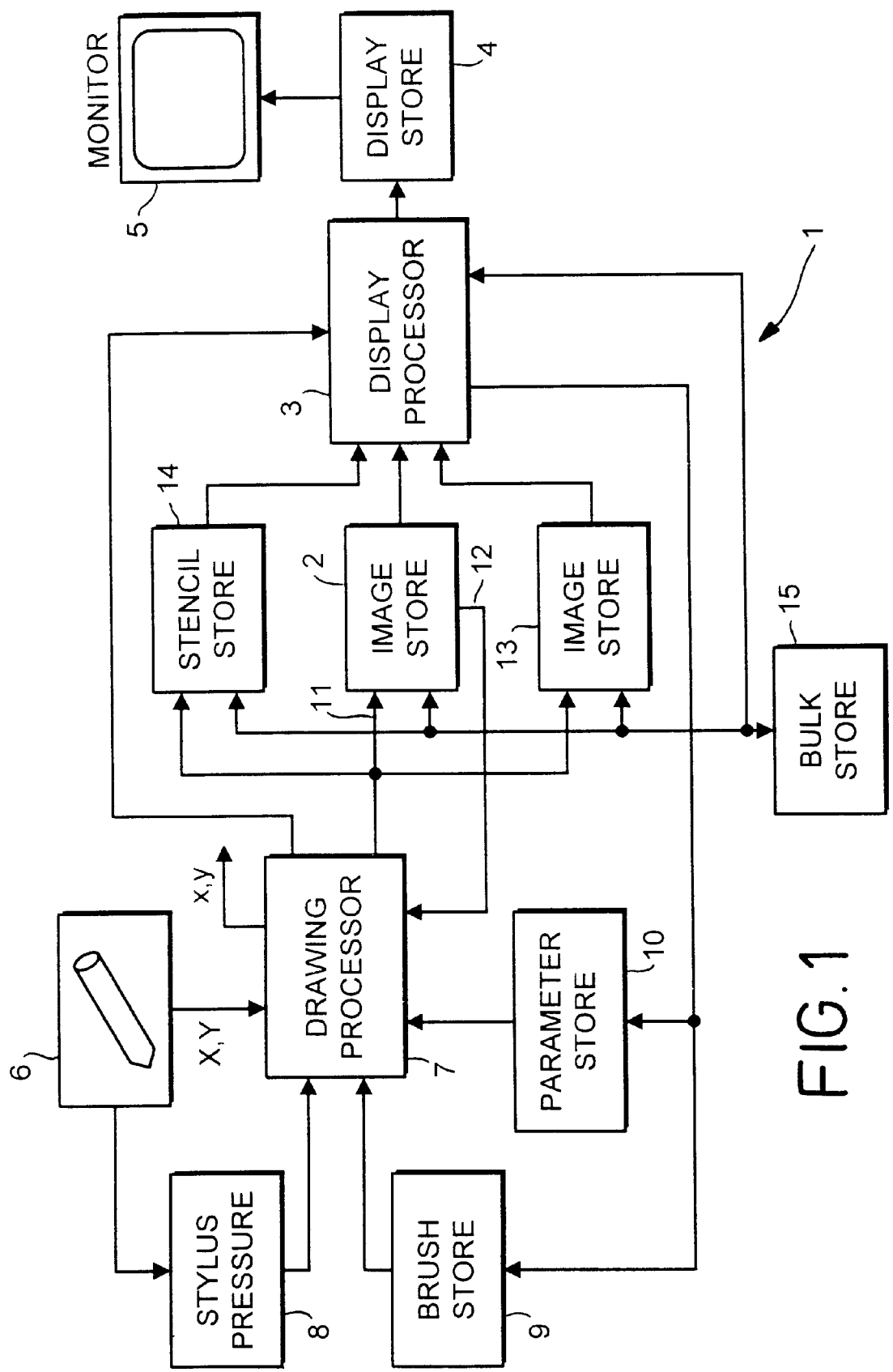
FIG. 1 is a schematic diagram of an electronic graphic system embodying the invention.

Referring now to FIG. 1 of the accompanying drawings, an electronic graphic system, indicated generally at 1, comprises a first image store 2 for storing data defining a first image, a display processor 3, a display store 4 and a monitor 5. The contents of the first image store 2 are read continuously in raster sequence via a serial access port by the display processor 3 and the thus scanned data is output by the display processor 3 to the display store 4 for display of the image represented thereby on the monitor 5.

The system 1 also comprises a user operable stylus/touch tablet device 6 by which the user can modify the image data in the store 2, and hence the image represented thereby. As the stylus is drawn across the touch tablet signals representative of the instantaneous position X,Y of the stylus are output to a drawing processor 7. The display processor 3 and the drawing processor 7 are shown as separate entities in order to facilitate understanding by simplifying the following explanation. In practice the two processors 3, 7 may be provided as a single processing Lnit.

The position information X,Y is provided at a higher resolution than that of the image store 2. That is to say, the spacing between adjacent addresses in the store 2 is significantly larger than the spacing between adjacent positions on the touch tablet 6. It follows that for a given pixel location in the store 2 there are a number of corresponding positions on the touch tablet 6. For example, the spacing between adjacent positions on the touch tablet may be say eight times smaller than that between adjacent addresses in the store 2, and thus there will be sixty four touch tablet positions corresponding to one pixel address in the store. The drawing processor 7 is arranged among other things to convert the instantaneous X,Y position information from the stylus/touch tablet 6 into data representing an equivalent location in the store 2. The equivalent location is defined in terms of a store address and an offset. The offset is calculated as the difference between the store address and the position X,Y of the stylus on the touch tablet. The offset has both vertical and horizontal components each having a value of less than one pixel. In the above example the offset would have component values which are integer multiples of ⅛.

As the user moves the stylus on the touch tablet the position data X,Y is continuously generated by the touch tablet 6 and delivered to the drawing processor 7 where it is converted into x,y data identifying patches of store addresses in the store 2. Each patch of addresses is centred over the location in the store equivalent to the corresponding X,Y position data generated by the touch tablet.

The stylus of the stylus/touch tablet device 6 also includes a pressure sensor that outputs a pressure related signal for storage as a parameter in a stylus pressure register 8. Modem stylus touch tablet devices are also capable of generating data defining the orientation (twist) and defining the angle of the stylus in relation to the touch tablet. These parameters may be stored as well as or instead of the pressure data in the stylus register for use by the processor.

Notional drawing implements are predefined in the system 1 and are selectable by the user from a menu of options (not shown) generated by the display processor 3 and displayed on the monitor 5. When the user selects a particular implement, data defining a continuous three dimensional shape covering a patch of pixels and representing the profile of the implement. as described in our above mentioned patents, is stored in a brush store 9.

A selection of predefined colours is also provided in the displayed menu and the user may select one of these predefined colours or instead may define a colour of his own choosing. Data representing the selected colour is stored by the display processor 3 in a drawing parameter store 10.

The image store 2 also includes random access ports 11, 12 for random access writing or reading of data to and from the store 2 independently of the serial raster reading of data to the monitor 5. As the stylus is moved across the touch tablet, data at each addressed patch is read from the store 2 via the random access read port to the drawing processor 7. At the same time, brush shape data from the brush store 8 and colour data from the parameter store 10 are also input to the drawing processor 7. The reading of the brush patch data from the brush shape store 7 and the colour data from the parameter store 10 is synchronised to the generation of individual addresses within the patch of addresses by the drawing processor 7 which outputs said x,y patch addresses to the brush store 9 and reads signals from the parameter store 10.

In the drawing processor 7 the image data $I_{OLD}$ read from the image store 2 is processed with the colour data C, the brush data B and the stylus pressure data P to produce new image data $I_{NEW}$ which is written back to the image store 2.

One way in which the drawing processor 7 may process the image data is to interpolate the image data $I_{OLD}$ and colour data C using the product of the pressure data and the brush data as an interpolation co-efficient K to produce new data $I_{NEW}$ in accordance with the algorithm $I_{NEW}=KC+(1-K)I_{OLD}$. This processing serves to add data representing a patch of colour to the image data in the store. In the displayed image the patch appears as if an area of colour has been stamped into the image. The drawing processor 7 is arranged to combine colour data into the image data at regular intervals of time or distance. Thus, as the stylus is moved over the touch tablet data representing a series of overlapping patches of colour ("stamps") is added to the image data in the store and appears in the displayed image as a continuous line or stroke. In the following the read-modify-write operation will be referred to as "painting" or "stamping" as the context requires.

In addition to the above described painting operation, the system 1 is operable to perform image compositing. The system further comprises a second image store 13 for storing data defining a second image, and a stencil store 14 for storing data defining a control image or stencil. Conceptually the image stores 2 and 13 and the stencil store 14 are separate entities, but it will be appreciated that in practice they may be provided in a single large random access store with the capacity to store data relating to at least two colour images and one monochrome control image.

For the sake of clarity, ports equivalent to the port 12 are not shown in FIG. 1 but both the image store 13 and the stencil store 14 include such ports. Thus, a colour image may be "painted" into either of the image stores 2, 10 and a monochrome image may be painted into the stencil store 11. Alternatively, image data from a bulk store 15 such as a video tape recorder or a frame random access store of the kind described in British Patent Application No. 9226199.9 for example, or another source such as a camera or a scanners may be loaded directly into any or all of the two image stores 2, 10 and the stencil store 11. In the following explanation it will be assumed that the image store 2 is used to store data representing a foreground image (F), the image store 13 is used to store data representing a background image (B), and the stencil store 14 is used to store control data (K) defining how the foreground image is to be overlayed on the background image.

The system is operable to interpolate the foreground image data (F) and the background image data (B) using the control image data (K) as an interpolation coefficient to produce data representing a composite image (IC) in accordance with the compositing algorithm $I_C = KF + (1-K)B$. It will be appreciated that when the stencil data K has a value equal to 0 then the composite image data $I_c$ will be equal to the background image data B. When the stencil data K has a value equal to 1 then the composite image data $I_c$ will be equal to the foreground image data F. For values of K between 0 and 1 the composite image data $I_c$ will contain contributions from both the foreground image data and the background image data.

In one mode of operation the system 1 can be arranged to enable the user to paint the foreground image into the first image store 2. In this mode of operation as the foreground image data is painted into the image store 2, data representing a corresponding stencil is painted into the stencil store 14. Previously created background image data from an image data source (not shown) is stored in the second image store 13. Data from the two image stores 2, 13 and from the stencil store 14 are read continuously in raster sequence to the display processor 3. The display processor combines the foreground image data from the image store 2 with the background image data from the image store 13 using the control image data from the stencil store 14 in accordance with the above-mentioned compositing algorithm. The composite data is output to the monitor 5 for display of the composite image represented thereby. Thus, as the foreground image and the stencil are painted into the image store 2 and the stencil store 14 respectively, the corresponding change can be seen in the composite image displayed on the monitor 5.

In another mode of operation previously created data representing foreground and background images are written into the image stores 2 and 13 respectively and the drawing processor 7 is arranged to enable the user to paint a control image into the stencil store 14. Again, the two image stores 2, 13 and the stencil store 14 are read in raster sequence to the display processor 6 where they are combined and output to the display store 4 for display of the composite image on the monitor 5. Thus, the composite image displayed on the monitor 4 changes as the control image is painted to enable the user to see the effect of his painting in combining the foreground image with the background image.

In both of the above-described modes of operation the image data in the two image stores 2, 13 are kept separate. Once the user is satisfied with the displayed composite image, the image data in the two stores is combined by the drawing processor 7 in accordance with the control image data in the store 11. The data is read a pixel at a time from both image stores 2, 13 and the stencil store 14 and combined in accordance with the above-discussed compositing algorithm. The composite data may be written back to one of the stores, say store 13, replacing the data previously stored therein to enable further processing thereof, and/or it may be written to the bulk store 15 for more permanent storage.

In addition to the above-described painting and compositing operations, the system 1 is operable to apply an effect, which will be referred to herein as "dots", to an image held in one or both of the image stores 2, 13. One of the simplest dots effect involves processing data representing the entire image so as to generate therefrom data representing a dots image comprising a grid of brush stamps (i.e. dots) in which the colour of each brush stamp is the colour value of a pixel at an address in the image data corresponding to the position of the dot. Examples of various dots images are shown in FIGS. 2 to 5 of the accompanying drawings. The manner in which each of the dots images shown in FIGS. 2 to 5 are created will be described in greater detail hereinafter.

The display processor 3 is arranged to display on the monitor a menu of options (not shown) including a dots image option. Options are selected by user manipulation of the stylus on the touch tablet. When the dots image option is selected the system 1 is reconfigured into the arrangement shown in FIG. 6 of the accompanying drawings. As shown therein the parameter store 10 comprises a dot spacing register 21, a dot density register 22, a dot offset register 23, a dot dither register 24 and a dot size register 25. The various dot registers 21 to 25 contain data which together define a dots effect to be applied by the drawing processor 7 to an image defined by data in the image store 2, 13. The data in each store can be varied on a dot-by-dot basis. In order to simplify the following explanation, the generation of data for a single dot will be described, the process being repeated for every dot that is to be created in the final dots image.

Each dot in the grid is of a respective uniform colour throughout the dot. The colour of each dot may be selected to be the same as the colour of one of the pixels in the initial image within the area covered by the dot. As a matter of convenience the colour of the pixel at a position in the initial image corresponding to or nearest to the centre of the dot is selected as the colour of the dot. Of course any other pixel within the area of the dot could be selected instead if so desired. To this end the system 1 comprises a sample address generator 27 connected to receive dot spacing data from the register 21. The dot spacing data defines the size of the grid, and the sample address generator is therefore able to calculate therefrom an address in the image store 2, 13 corresponding to the centre of the dot. Data at the address generated by the sample address generator 27 is read to a sampled colour register 28 for use by the drawing processor 7 in producing the dot.

The position of the dot in the final dots image is, of course, determined by the dot spacing data, but if desired the dot may be offset from the position in the grid defined by the dot spacing data. The dot offset register 23 contains offset data that defines a position in the final image offset from the grid position of the dot. Similarly, the dot dither register 24 contains offset data that defines a random offset from the grid position of the dot. The offset data, the dither data and the spacing data are supplied to a dot position generator 29. Although the address generators 27, 29 are conceptually different, they may in fact be provided in a single address generating unit that generates all necessary addresses from the data in the parameter store 10. The offset data and the dither data may be used alone or in combination by the dot position generator 29 together with the dot spacing data to generate an (x, y) address in the image store 2, 13 corresponding to the position in the final dots image at which the centre (or other point) of the dot is to be located.

The drawing processor 7 also receives dot size data from the size register 25, dot density data from the density register 22 and brush data from the brush store 9. The dot density data enables the opacity of the dot to be varied and the brush data defines the shape of the dot. The size of the dot is defined by the data in the dot size register 25. Since the dot size is variable it is unlikely that data in the brush store 9 providing a single definition of a "brush" or dot would provide a dot equal in size to that defined by the size data. The system therefore includes a spatial filter 30 for converting the data in the brush store 9 into an area of data equal in size to the selected size of the dot. The design of spatial digital filters is per se well known. British Patent Application No. 9518443.8, the teachings of which are incorporated herein, describes in detail a filter circuit that is suitable for use as the filter 30.

The filter 30 may be arranged to calculate in advance brush data for possible sizes of dot that may be selected for inclusion in the final dots image. In this arrangement the basic brush data (of a given size and selected form) is written into the brush store 9. The data is then read from the store, varied (enlarged or reduced) in size, and then written back to the store 9 alongside the basic data. This process is repeated for every possible dot size so that the brush store 9 contains data representing a full set of different sizes of the same brush. Thereafter, the dot size data from the size register 25 is used on a dot-by-dot basis to select data for the correctly sized brush for output to the drawing processor 7. Alternatively, the filter 30 may be arranged to produce the brush data for the dot in accordance with the size specified by the data in the size register 25 as and when the data is required. In this alternative arrangement the dot size data is supplied to the filter 30 on a dot-by-dot basis to enable the filter to read the data from the brush store 9, filter the data to produce data for an area of the specified size, and supply the thus produced data to the drawing processor 7.

Together the sampled colour data, the density data, the position data, the size data and the filtered brush data enable the processor to generate data representing a dot of a given colour, opacity and size, and to write that data at an area of addresses in the store 2, 13 corresponding to the position of the dot in the final dots image.

Figure 2:
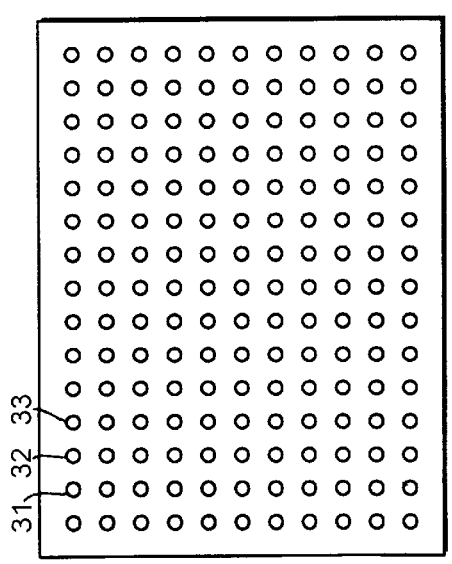
FIG. 2 shows an effect produced by the system of FIG. 1.

As has already been mentioned a small selection of the effects achievable by the system 1 is shown in FIGS. 2 to 5 of the accompanying drawings. FIG. 2 represents a simple effect in which small circular dots 31 to 33 are evenly spaced over the entire image. Each of the dots 31 to 33 is of a size covering several pixels in the image, but the colour of each dot 31 to 33 is uniform and depends on the colour value of the single pixel at the corresponding x,y position in the original image.

Figure 3:
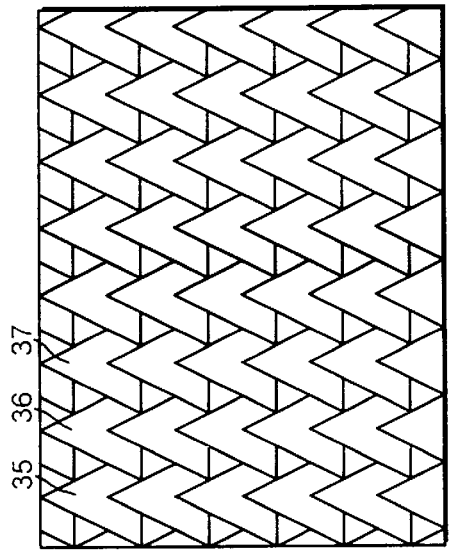
FIG. 3 shows an effect produced by the system.

The effect shown in FIG. 3 is created by defining a triangular brush profile in the brush store 9, defining a large dot size in the dot size register 25, and defining a spacing between dot positions in the register 21 that is smaller than the dot size. Making the dot size larger than the dot spacing causes dots 35, 36 in the resulting image to overlap. The manner in which the dots overlap will affect the appearance of the resultant image. As shown in FIG. 3 dots to the right and bottom of the image appear on top of dots to the left and top of the image.

For a fixed dot spacing as the dot size increases the resolution of the resultant image decreases until the content of the original image cannot be seen in the resultant image. However, dot size can be made very large, e.g. tens or even hundreds of pixels, while spacing is made very small, e.g. one pixel. As dot size increases and spacing decreases the number of overlapping dots becomes larger so that each dot only makes a small contribution to the resultant image. Consequently, the resolution of the resultant image reaches a point where it begins to increase with increasing dot size and decreasing spacing and then continues to increase so that the content of the original image again becomes visible. However, because of the way in which the dots overlap, for example as discussed hereinabove, the effect will be to shift the content of the image leftward and upwardly in the resultant image. The dot offset data in the offset register enables offsets in x and/or y directions to be added to the dot address data to compensate for such shifting.

Figure 4:
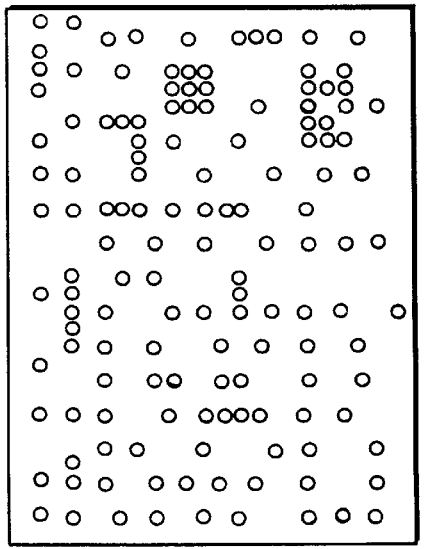
FIG. 4 shows an effect produced by the system.

FIG. 4 of the drawings shows an example of a dot effect in which the dots 37 are of uniform size but the spacing between dots is random. This effect is achieved by preloading a single dot size value into the dot size register 25 and loading a different random number from a random number generator (not shown in FIG. 6) into the dot spacing register 21 for each dot.

Figure 5:
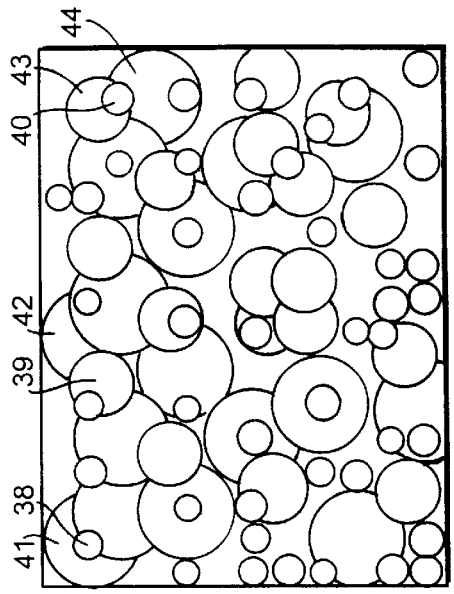
FIG. 5 shows an effect produce by the system.

FIG. 5 of the accompanying drawings shows an example of a dot effect generated by randomising both the dot spacing and dot size. Simply laying the dots down in order, for example from left to right and top to bottom as described herein with reference to FIG. 3, would result in some smaller dots, e.g. dots 38, 39, 40 being partially or wholly obscured by larger dots, e.g. dots 41, 42, 43, 44. Therefore, when dots of different size are generated the system is arranged such that the display processor 3 first outputs data for the largest dots to the display store 4 and/or the image store 13 in a predetermined order (e.g. top left to bottom right), then outputs the data for the next largest dots in order and so on down to the smallest dots. In this way, small dots are not obscured by large dots in the resultant image.

The order in which the dots data is to be written into the store is calculated before the dots data is generated. Data defining the size and position of each dot is generated by the patch address generator 23 and the parameter calculator 25 in the drawing processor 7 and stored as a list in an internal data store (not shown). Once the list is complete the data is reordered so that the largest dots are identified first and the smallest dots are identified last. The dots data is then written to the image store 2, 13 in the order defined by the list. Alternatively, or additionally, the dots may be sorted in order of density so that more transparent dots are written to the store after more opaque dots or they may be sorted in order of luminance with one effect being achieved by writing data for brighter dots to the store first and another effect being achieved by writing brighter dots to the store last.

The dot spacing, density, offset and size data stored in the registers 21, 22, 23 and 25 in the parameter store 10 is generated under user control. In response to user manipulation of the stylus on the touch tablet 6 the display processor 3 is arranged to display a menu of options (not shown) which enables the user to select various controls. the menu includes boxes into which minimum and maximum values and a random percentage value may be entered and control boxes for enabling stencil control and for enabling random number generation.

Figure 7:
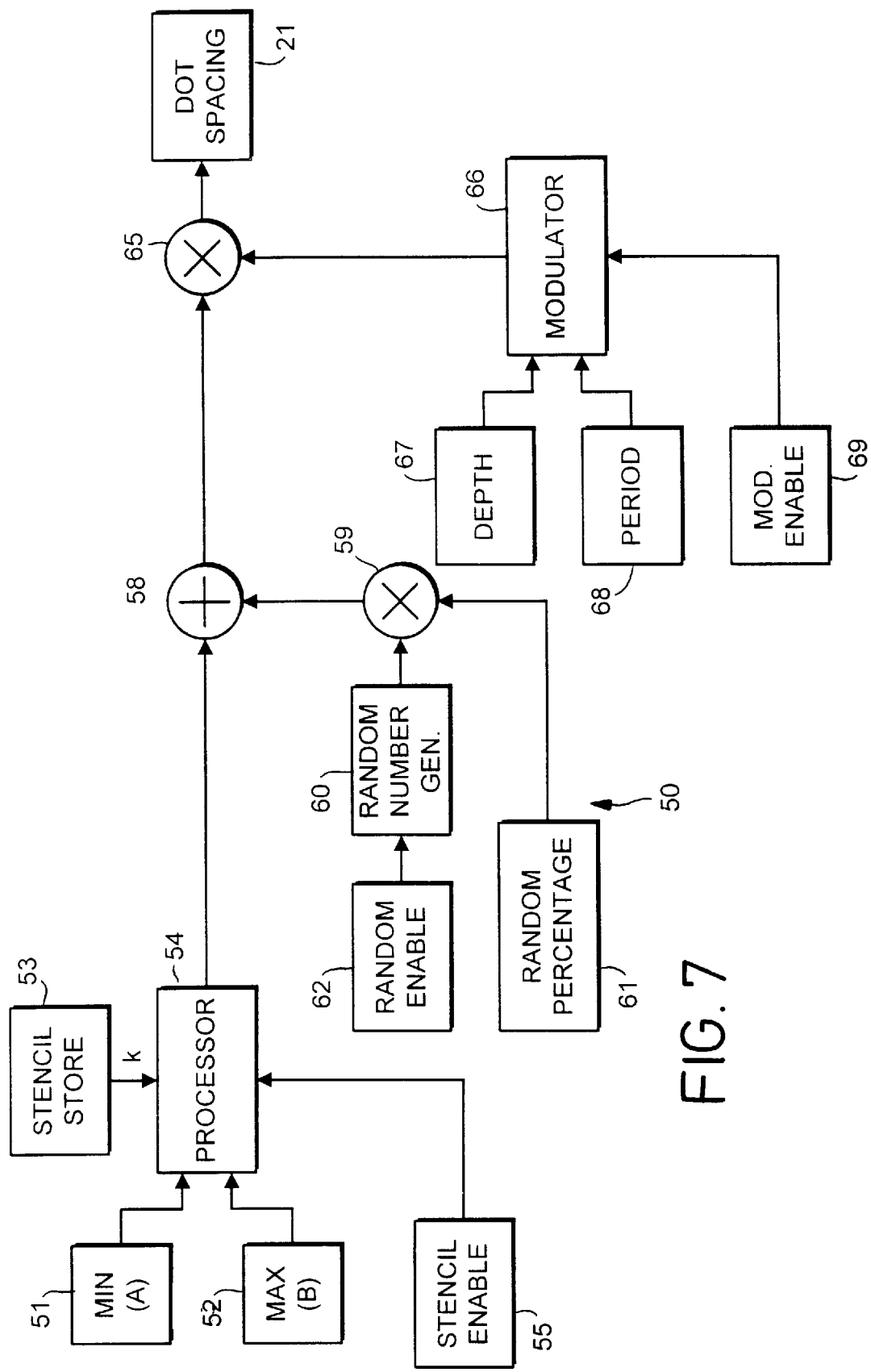
FIG. 7 shows a parameter calculating sub-system.

FIG. 7 of the accompanying drawings shows a sub-circuit 50 of the system 1 for generating dot spacing data for the spacing register 21 in response to user manipulation of the control boxes in the aforementioned menu. Similar sub-circuits are provided for generation of the density, offset and size data. The sub-circuit 50 shown in FIG. 7 comprises a minimum value register 51 and a maximum value register 51 in which user selected minimum and maximum values are stored. In the event that the user chooses not to specify minimum and maximum values the values are set to 0 and 100% respectively.

A control image or stencil is used to control the dot spacing in the final dots image. A stencil is used to provide the control because it has been found that such an image can be easily manipulated by a user to obtain unusual (and otherwise difficult) effects in the final dots image. For example a stencil of uniform intensity will produce a dots image with evenly spaced dots, a stencil with high intensity to one side reducing gradually to low intensity at the opposing side will produce a dots image with widely spaced dots to one side changing to closely spaced dots to the other side, and using a monochrome image of, say, a logo as the stencil can result in a dots image in which the logo appears to be embossed in the image. A stencil store 53 is provided for storing the stencil data. It will be appreciated that another source of control data such as a signal or pattern generator could be provided in place of or as well as the stencil store 53.

The minimum and maximum registers 51, 52 and the stencil store 53 are connected to a processor 54 which processes the data therefrom in accordance with the equation:

$$output = (1-k)A + kB$$

where output is the value output by the processor 54, k is the value of the stencil data, A is the minimum value and B is the maximum value. The effect of this processing is to scale the stencil data k within the minimum and maximum values, so that a value of k=0 is set to the minimum value a value of k=1 is set to the maximum value and a value of 0<k<1 is set to a value proportionately between the minimum and the maximum values.

It is not necessary to use a control image where a simple effect with regular dot spacing is required. The menu (not shown) displayed on the monitor 5 by the display processor 3 includes a "stencil enable" box and the sub-system 50 includes a stencil enable register 54 for storing data indicating whether or not the user has chosen to enable the use of a control image. When the stencil is not enabled, the display processor 3 is arranged to display in the aforementioned menu a single box denoting "dot spacing" in place of the minimum and maximum value boxes. When a value is entered in the dot spacing box (by manipulating the stylus/touch tablet device) corresponding data is stored in the maximum value register 52. The processor 54 responds to the non-enablement of the stencil (as indicated by the data in the register 55) by ignoring the data in the stencil store 53 and instead outputting the data directly from the maximum value register 55.

Data from the processor 54 is input to an adder 58 where it is added with data from a random number multiplier 59. The multiplier 59 is connected to a random number generator 60 and to a random percentage value register 61. The random number generator 60 is arranged to produce a random number between and including 0 and 1. The random number is scaled by the multiplier 59 with the value from the percentage register 61. The effect of adding a scaled random number to the output from the processor 54 is to randomly vary the output by the percentage range. Thus, a spacing of say 20 pixels and a random percentage of say 20% would result in the adder 58 outputting data that varied randomly between 20 and 24 pixels. A random enable register 62 is also provided for enabling or disabling the random number generator 60. The contents of the register 62 is determined by user manipulation of a "random" box in the aforementioned menu.

Data from the adder 58 is input to a multiplier 65 where it is multiplied by data from a modulator 66. The modulator 66 is arranged to produce modulating data which varies on a cyclic basis. The depth and period of modulation are specified by data held in depth and period registered 67, 68, which data is specified by the user by way of the aforementioned menu (not shown). A modulation enable register 59 is also provided for switching the modulator 66 on and off. When the modulation facility is selected, the data output from the adder 58 is modulated by a user specified depth and period. The data output from the multiplier 65 is held in the dot spacing register 21 for processing of the dot by the drawing processor 7 as described hereinabove. Thus, the sub-system 50 serves to produce on a dot-by-dot basis data for the dot spacing register 21. Similar or identical sub-systems are provided in parallel for generation of the dot size, dot density and dot offset data.

Figure 8:
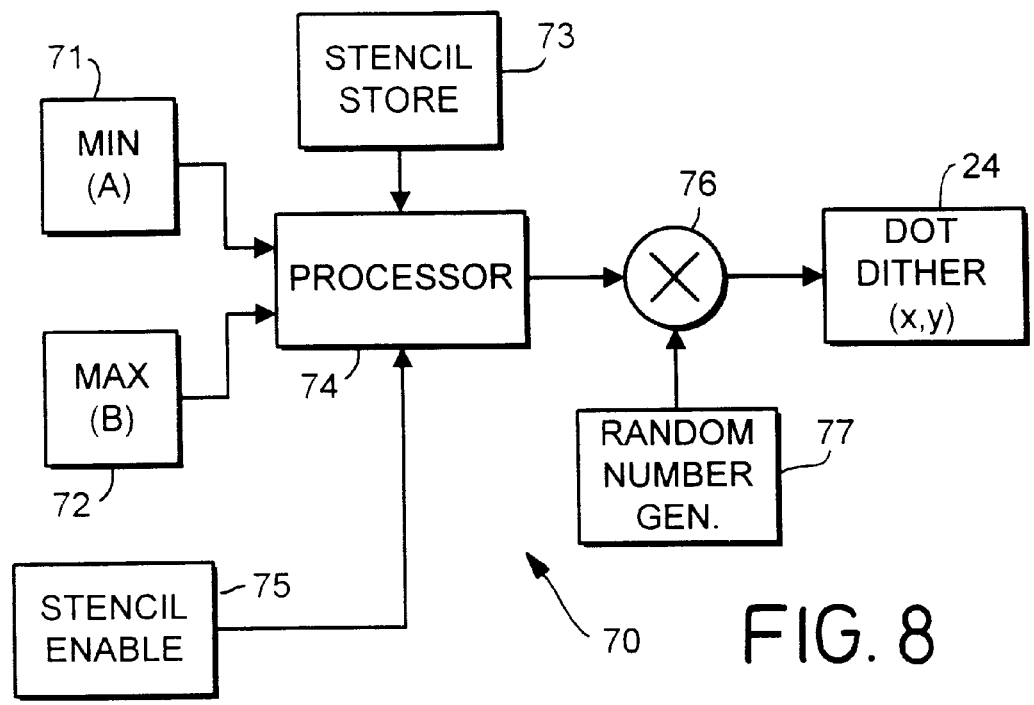
FIG. 8 shows another parameter calculating sub-system.

The dot dither data is generated by a simpler sub-system 70 a shown in FIG. 8 of the accompanying drawings. The sub-system 70 comprises minimum and maximum value registers 71, 72, a stencil store 73 (which may be the same as the stencil store 53 of the dot spacing sub-system 50), a processor 74 and a stencil enable register 75 which operates in the same manner as above described for the equivalent elements in the dot spacing sub-system 50. The output from the processor 74 is input to a multiplier 76 where it is multiplied by a random number from a random number generator 77. The product output from the multiplier 76 defines a random distance which is stored in the dither store 24 for interpretation by the processor as a random offset from the defined dot position. Dot positions are defined in two dimensions (x and y) and the dot dither data is therefore also defined in two dimensions by the sub-system 70. (Similar considerations also apply to the dot offset data generated by a subsystem equivalent to the sub-system 50 of FIG. 7.)

The system is not limited to varying only the size and spacing of the dots in the resultant image. Dots of any shape may be defined by the user creating data defining a custom brush profile for storing in the brush store 9. An apparatus and method for creating data defining custom brush profiles is described in co-pending British Patent Application No. 9618668.9 (Q126), the teachings of which are incorporated herein by reference.

Custom brushes need not by symmetrical. The system 1 as shown in FIG. 6 can be configured to vary the orientation of the brush by adding another register to the parameter store 10 for storing brush orientation data fro use by the filter 30 in rotating the brush represented by the data from the brush store 9 before that data is input to the drawing processor 7. A sub-system similar to that shown in FIG. 7 would be provided to generate the brush orientation data.

Once data representing the dot effect image has been written into the image store 13 it may be combined with the data in the image store 2 by painting as described hereinabove with reference to FIG. 1. In this way, the dots effect image may be selectively combined with the initial image to produce a composite image in which the dots effect is limited to specified areas in the composite image.

The dots effect can also be applied in a video editing environment. The bulk store 15 may for example be a frame random access store such as described in co-pending British Patent Application No. 9226199.9 and co-pending U.S. patent application Ser. No. 08/162,645, the teachings of which are incorporated herein by reference. Such a bulk store enables individual frames of data to be transferred to the image stores 2, 13 and the stencil store 14, 53, 73 to be processed by the processors 3, 7 and to be output for display and/or storage in the bulk store at video rate. Thus, the effects described hereinabove including the effects shown in FIGS. 2 to 5 of the accompanying drawings may be applied to each frame in a video clip. Parameters such as dot size, dot spacing, dot shape (as defined by the data in the brush store 9) may be varied in the clip over time (i.e. frame-by-frame) as required.

Figure 9:
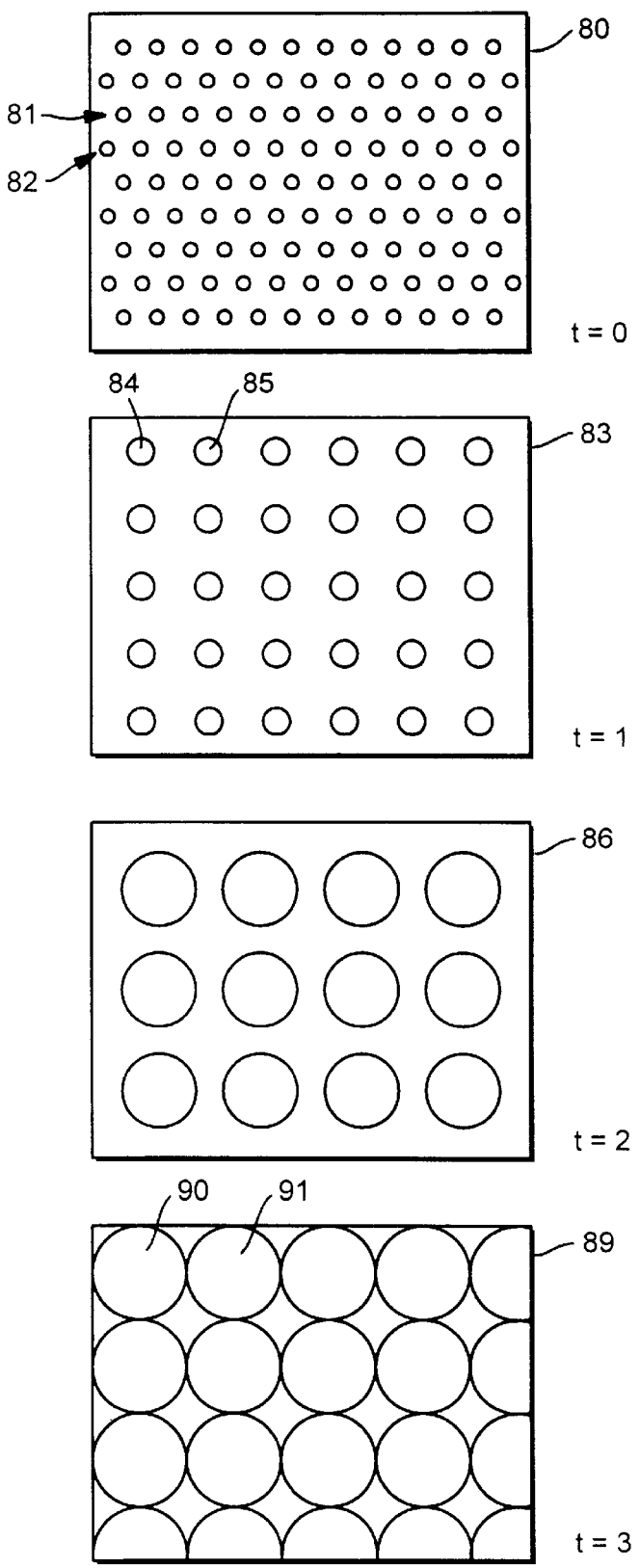
FIG. 9 shows an effect produced by the system.

One relatively simply time varying effect is shown in FIG. 9 of the accompanying drawings. A video frame 80 at a first instant of time t=0 comprises a dots effect image in which multiple non-overlapping dots of uniform size are offset in the horizontal position between adjacent lines 81, 82. At another instance of time t=1 (which may correspond to the next frame in the video sequence or a later frame in the sequence) a frame 83 is produced comprising a uniform grid of non-overlapping uniform sized dots 84, 85. For a later frame at time t=2 the effect is changed to dots of a greater size with a greater spacing between each dot. Finally, at a later time t=3 the effect is changed to produce a frame 89 comprising relatively few larger dots that are evenly spaced. The size of the dots 90, 91 is equal to the spacing between the dots so that the dots touch, but do not overlap each other.

A time varying effect such as this for example enables an editor to cut between two different video clips by moving through the sequence of effects 80, 83, 86, 89 to fade out of one frame and then reversing through the sequence 89, 86, 83, 80 into the new clip. In order to simplify illustration the changes shown in FIG. 7 are coarse, but it will be appreciated that a smooth transition from frame to frame can be achieved by gradually varying the dot parameters.

Figure 10:
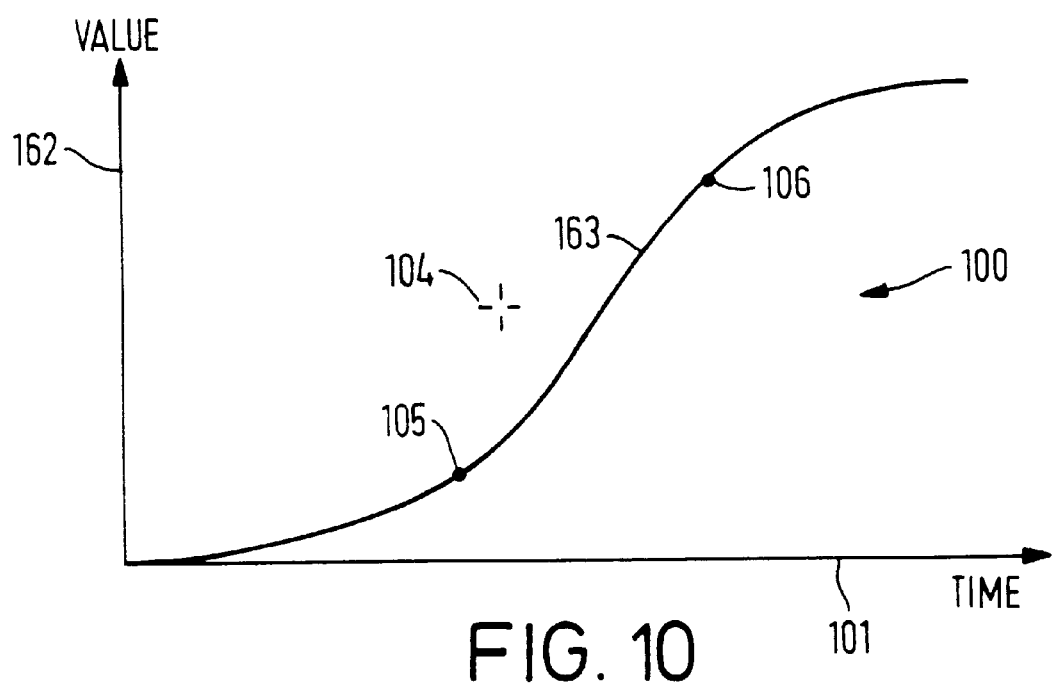
FIG. 10 shows a graph used in producing the effect shown in FIG. 9.

One way in which the dot parameters may be varied between frames is by way of a control function generated by way of manipulation of a graph displayed on the monitor 5. The display processor 3 is arranged to respond to commands input by user manipulation of the stylus/touch tablet by displaying a time/parameter value graph such as shown in FIG. 10 of the accompanying drawings. The graph 100 comprises a horizontal time axis 101 scaled to represent a portion of or the entire video clip and a vertical axis 102 representing the value of the controlled parameter (dot spacing, dot density, dot offset, dot dither, dot size). A plot 103 represents the control function.

With the graph for a selected parameter displayed on the monitor 5, the display processor 3 is arranged to respond to manipulation of the stylus/touch tablet 6 by moving a cursor 104 over the graph 100. The cursor 104 may be placed on the plot 103 at any user selected point, e.g. point 105 or 106, and the stylus manipulated such that subsequent movement of the cursor 104 causes the position of the point 105, 106 to be changed. The plot 103 is then recalculated to pass through the selected points. The display and manipulation of graphs to define a control function is per se well known and need not be described in any greater detail herein.

Thus, the graph 100 enables the user to define values for a selected parameter over time. The values thus defined are input to the maximum value register of the appropriate sub-system (e.g. sub-system 50 for dot spacing) on a frame-by-frame basis. The stencil is disabled so that the data from the maximum value register passes through the processor 54 (or its equivalent in another sub-system) unprocessed.

Other visually interesting effects can be achieved in the selected portions of a video clip by creating data defining a mask for each frame in the video clip and using the mask data in the stencil store 14 as a control image. The dots effect can be made to vary over time within the area defined by the mask. For example, varying the size and spacing of the dots on a random basis over time would create an effect of bubbling dots (of any desired shape) within the image portion defined by the mask.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An electronic graphic system comprising:
    an image store for storing data defining a multiplicity of picture elements that together form an initial image;
    an address generator for generating address data identifying multiple dot areas in the store, each area containing data defining a plurality of picture elements of the initial image; and
    a drawing processor for processing the data in each dot area so that picture elements in the dot area are defined by data of a substantially uniform value, the processed data thus defining a multiplicity of picture elements that together form a processed image of multiple dot areas derived from the initial image data.

2. A system as claimed in claim 1, further comprising a parameter store for storing data defining characteristics of the dot areas of the processed image.

3. A system as claimed in claim 2, wherein the parameter store comprises a spacing register for storing spacing data defining the spacing between dot areas in the processed image, which register is connected to the address generator.

4. A system as claimed in claim 3, wherein the address generator comprises a sample address generator for generating from the spacing data for each dot area an address in the image store from which data is sampled to determine the substantially uniform value to be used as the data defining the dot area.

5. A system as claimed in claim 4, wherein the address generator comprises a dot position generator for generating position data representing positions of dot areas in the processed image from the dot spacing data.

6. A system as claimed in claim 5, wherein the parameter store comprises a dot offset register for storing data representing a selected offset to be used by the dot position generator in generating the position data.

7. A system as claimed in claim 5, wherein the parameter store comprises a dot dither register for storing data representing a random offset to be used by the dot position generator in generating the position data.

8. A system as claimed in claim 2, wherein the parameter store comprises a dot density register for storing data representing dot density for use by the processor in processing the data for each dot area.

9. A system as claimed in claim 2, further comprising a brush store for storing dot form data defining the form of the dot areas.

10. A system as claimed in claim 9, further comprising a filter for filtering the dot form data.

11. A system as claimed in claim 10, wherein the parameter store comprises a dot size register for storing dot size data, and the filter is arranged to filter the dot form data depending on the dot size data.

12. A system as claimed in claim 10, wherein the filter is arranged to filter the dot form data to produce data representing a set of dot forms of different sizes, which data set is stored in the brush store.

13. A system as claimed in claim 2, further comprising a user operable device for inputting control values and a sub-system for generating data for storing in the parameter store depending on the input control values.

14. A system as claimed in claim 13, wherein the sub-system comprises maximum and minimum value registers for storing user input data representing a maximum value and a minimum value of a parameter and a processor for processing control data output for the parameter store.

15. A system as claimed in claim 14, further comprising a stencil store for storing data representing a stencil image, the stencil store being connected to supply the stencil data for use as the control data by the processor.

16. A system as claimed in claim 14, further comprising an enable register for storing user input enabling data for enabling the processor to process the control data.

17. A system as claimed in claim 16, wherein the processor is arranged to output the data in the maximum value register to the parameter store when not enabled by the enabling data to process the control data.

18. A system as claimed in claim 14, wherein the subsystem comprises a random number generator for outputting a random value and an adder for adding the random value to the data output by the processor, and a random enable register for storing user input enabling data for enabling the random number generator.

19. A system as claimed in claim 18, further comprising a random percentage register for storing user input percentage data, and a multiplier for multiplying the random value by the percentage data before the value is output to the adder.

20. A system as claimed in claim 14, wherein the subsystem comprises a modulator connected to depth and period registers for storing user input depth and period data, the modulator generating modulating data depending on the depth and period data, the system further comprising a multiplier for multiplying the data for the parameter store by the modulating data, and a modulator enable register for storing user input enabling data for enabling the modulator.

21. A system as claimed in claim 14, wherein the subsystem comprises a random number generator for outputting a random value and a multiplier for multiplying the data output by the processor by the random value so as to produce dither data defining a random position offset of dot areas in the processes image.

22. A system as claimed in claim 2, wherein the data in the parameter store is arranged to vary on a frame by frame basis and the processor is responsive to the data in the parameter store to process each video frame so as to produce a video clip comprising time varying multiple dot areas.

23. A system as claimed in claim 22, wherein the data in the parameter store is varied in accordance with at least one function generated in response to user manipulation of the display of graph.

24. A system as claimed in claim 1, further comprising a second image store for storing the processed data.

25. A system as claimed in claim 24, further comprising a user operable device for generating position data identifying a position and data representing another drawing parameter, the processor being responsive to said user operable device to address data in the image store and the second image store at store addresses corresponding to the position identified by the position data and to combine the addressed data from the stores depending on the other drawing parameter data.

26. A system as claimed in claim 1, further comprising a monitor for displaying the dot image defined by the processed data.

27. A system as claimed in claim 1, wherein, when the dot size is varied on a dot by dot basis, the drawing processor is arranged to output processed data in a predetermined order.

28. A system as claimed in claim 27, wherein the drawing processor is arranged to output data starting with dot areas at positions corresponding to the top and left sides of the image and ending with dot areas at positions corresponding to the bottom and right sides of the image.

29. A system as claimed in claim 27, wherein the drawing processor is arranged to output data starting with dot areas of the largest size and ending with dot areas of the smallest size.

30. A system as claimed in claim 1, further comprising a video data source for supplying data defining a plurality of video frames that together form one or more video clips a frame at a time to the image store for processing by the drawing processor.

31. A system as claimed in claim 30, wherein the processor is arranged to process the video data on a frame by frame basis to produce data defining a processed video clip comprising a plurality of video frames each comprising multiple dot areas.

32. A system as claimed in claim 31, wherein the data in the parameter store is arranged to vary on a frame by frame basis and the processor is responsive to the data in the parameter store to process each video frame so as to produce a video clip comprising time varying multiple dot areas.

33. A system is claimed in claim 30, wherein the video data source comprises a bulk store.

34. A system as claimed in claim 33, wherein the bulk store is a frame random access store enabling access to any frame of data in a frame period and simultaneously enabling the writing of a frame of data to any location therein in a frame period.

35. A method processing image data the method comprising:

storing in a store data defining a multiplicity of picture elements that together form an initial image;

generating address data identifying multiple dot areas in the store, each area containing data defining a plurality of picture elements of the initial image; and processing the data in each dot area so that picture elements in the dot area are defined by data of a substantially uniform value, the processed data thus defining a multiplicity of picture elements that together form a processed image of multiple dot areas derived from the initial image data.

36. A method as claimed in claim 35, further comprising storing in a parameter store data defining characteristics of the dot areas of the processed image.

37. A method as claimed in claim 36, further comprising storing in the parameter store spacing data defining the spacing between dot areas in the processed image.

38. A system as claimed in claim 37, comprising generating from the spacing data for each dot area an address in the image store from which data is sampled to determine the substantially uniform value to be used as the data defining the dot area.

39. A method as claimed in claim 38, further comprising generating position data representing positions of dot areas in the processed image from the dot spacing data.

40. A method as claimed in claim 39, further comprising storing in the parameter store data representing a selected offset to be used by the dot position generator in generating the position data.

41. A method as claimed in claim 39, further comprising storing in the parameter store data representing a random offset to be used by the dot position generator in generating the position data.

42. A method as claimed in claim 36, further comprising storing in the parameter store data representing dot density for use in processing the data for each dot area.

43. A method as claimed in claim 36, further comprising inputting control values and generating data depending on the input control values.

44. A method as claimed in claim 43, further comprising storing input data representing a maximum value and a minimum value of a parameter. and processing control data.

45. A method as claimed in claim 44, further comprising storing in a stencil store data representing a stencil image, the stencil store being connected to supply the stencil data for use as the control data.

46. A method as claimed in claim 44, further comprising storing user input enabling data for enabling the processing of the control data.

47. A method as claimed in claim 46, further comprising outputting the maximum value data to the parameter store when not enabled by the enabling data to process the control data.

48. A method as claimed in claim 44, further comprising adding a random value to the data for the parameter store.

49. A method as claimed in claim 48, further comprising multiplying the random value by percentage data before the value is added to the data for the parameter store.

50. A method as claimed in claim 44, further comprising generating modulating data depending on the depth and period data, and multiplying the data for the parameter store by the modulating data.

51. A method as claimed in claim 44, further comprising multiplying the data for the parameter by a random value so as to produce dither data defining a random position offset of old areas in the processes image.

52. A method as claimed in claim 35, further comprising storing dot form data defining the form of the dot areas, and filtering the dot form data depending on the dot size data.

53. A method as claimed in claim 35, further comprising for storing dot form data defining the form of the dot areas, and filtering the dot form data depending on the dot size data.

54. A method as claimed in claim 35, further comprising storing dot form data defining the form of the dot areas, and filtering the dot form data depending on the dot size data.

55. A method as claimed in claim 54, further comprising calculating filtering parameters depending on the dot size data.

56. A method as claimed in claim 35, further comprising a second image store for storing the processed data.

57. A method as claimed in claim 35, further comprising displaying the dot image defined by the processed data.

* * * * *

UNITED STATES PATENT AND TRADEMARK OFFICE
CERTIFICATE OF CORRECTION

PATENT NO.   : 5,986,665
DATED        : November 16, 1999
INVENTOR(S)  : Colin John Wrey and Matthew Sumner It is certified that error appears in the above-identified patent and that said Letter Patent is hereby corrected as shown below:

Cover page, add item --[30]   Foreign Application Priority Data
        Sep. 6, 1996   [GB]   United Kingdom ...............9618603.6
        Feb. 13, 1997  [GB]   United Kingdom ...............9702961.5--

Signed and Sealed this

Twenty-third Day of May, 2000

Attest:

Q. TODD DICKINSON

Attesting Officer          Director of Patents and Trademarks